United States Patent [19]

Meguro et al.

[11] Patent Number: 4,497,564
[45] Date of Patent: Feb. 5, 1985

[54] EXPOSURE MODE SETTING DEVICE IN AN EXPOSURE CONTROL APPARATUS OF A CAMERA

[75] Inventors: Hiroshi Meguro, Kawasaki; Yuji Okubo; Sakuji Watanabe, both of Omiya, all of Japan

[73] Assignee: Nippon Kogaku K.K., Tokyo, Japan

[21] Appl. No.: 513,406

[22] Filed: Jul. 14, 1983

[30] Foreign Application Priority Data

Jul. 20, 1982 [JP] Japan .......................... 57-108759[U]
Feb. 8, 1983 [JP] Japan ............................ 58-17162[U]

[51] Int. Cl.³ ...................... G03B 7/089; G03B 17/00
[52] U.S. Cl. ................................... 354/442; 354/435; 354/446; 354/460; 354/289.1
[58] Field of Search ................................ 354/441–445, 354/458–460, 289.1, 446–454, 435–440, 410

[56] References Cited

U.S. PATENT DOCUMENTS

| 4,086,584 | 4/1978 | Kozuki et al. | 354/442 |
| 4,089,014 | 5/1978 | Ueda | 354/442 X |
| 4,264,164 | 4/1981 | Motoori et al. | 354/459 |
| 4,435,057 | 3/1984 | Nakai et al. | 354/458 X |

Primary Examiner—William B. Perkey
Attorney, Agent, or Firm—Shapiro and Shapiro

[57] ABSTRACT

An exposure control apparatus of a camera comprises exposure control device adjusted to control the quantity of light applied onto a photosensitive film, a device for preparing a photometering output responsive to the quantity of light from an object to be photographed, the preparing device effective to prepare on the basis of the photometering output a first output used to adjust the exposure control device so that the quantity of light applied onto the film is proper, a device for setting the exposure amount by manual operation, the setting device being effective to prepare a second output used to adjust the exposure control device so that the set exposure amount is obtained, selecting device having a first selecting position for making the first output effective and a second selecting position for making the second output effective, in order to adjust the exposure control device, and operating device operated to store the photometering output, the operating device including change-over means operated when the selecting device is in the second selecting position to thereby act on the selecting device and make the first output instead of the second output effective.

10 Claims, 11 Drawing Figures

EXPOSURE MODE SETTING DEVICE IN AN EXPOSURE CONTROL APPARATUS OF A CAMERA

BACKGROUND OF THE INVENTION

1. Field of the Invention

This invention relates to an exposure control apparatus of a camera, and particularly to an exposure control apparatus of a camera in which manual exposure setting and automatic exposure setting are selectively possible.

2. Description of the Prior Art

The exposure setting of a camera, namely, the setting of photographing conditions, may be divided broadly into manual exposure setting and automatic exposure setting. In the manual exposure setting, the shutter dial of the camera and the aperture preset ring of the picture-taking lens are operated by the operator, whereby the aperture value and shutter time during exposure are arbitrarily set. In the automatic exposure setting there exist a plurality of kinds of control systems in which the aperture value and/or the shutter time is automatically set on the basis of the brightness of an object to be photographed measured by the photometering device of the camera and is classified by the difference between automatically set exposure factors, namely, shutter priority automatic exposure control, aperture priority automatic exposure control, programmed automatic exposure control, etc.

Where use is made of a camera provided with the two functions of manual exposure setting and automatic exposure setting and capable of arbitrarily selecting one of the two functions by a change-over dial or the like, it is the usual practice for the operator to normally select the automatic exposure setting and take a number of photographs and to select the manual exposure setting when he wants to introduce a special intention into photography. This is just because the automatic exposure setting is simple in operation and can quickly cope with any change of the object to be photographed. In such a camera, when a situation in which other object must be urgently photographed has occurred while photography is being carried out with the manual exposure setting selected, if the brightness of the object so far photographed and the brightness of the new object differ greatly from each other, it has been necessary either to manually re-set the aperture and shutter time to render the exposure proper or to operate a change-over dial provided externally of the camera for the selection of the automatic exposure setting. For such operations, it has usually been necessary for the operator to once take his eye off the finder, and this has led to the impossibility of quickly coping with the new object and the undesirable possibility of missing the shutter chance.

SUMMARY OF THE INVENTION

It is primary object of the present invention to provide an exposure control apparatus of a camera which is capable of being immediately changed over to an automatic exposure setting mcde by a simple operation when it has become necessary to urgently change the set photographing conditions.

It is another object of the present invention to provide a camera provided with second operating means capable of changing over the mode to an automatic exposure setting mode without operating a change-over dial for selecting a manual exposure setting mode and the automatic exposure setting mode.

It is still another object of the present invention to provide a camera in which the mode can be immediately changed over to the automatic exposure setting mode by the second operating means while particularly the manual exposure setting mode is selected by operation of the change-over dial.

In an embodiment of the present invention, the second operating means is designed such that when operated while the automatic exposure setting mode is selected, it operates a memory device for storing therein the object brightness information or the value of an automatically set exposure factor. This memory device stores therein a shutter time providing a proper exposure if the kind of the automatic exposure setting device contained in the camera is the aperture priority automatic exposure control, stores therein an aperture value providing a proper exposure if the kind of the automatic exposure setting device is the shutter priority automatic exposure control, and stores therein a shutter time and an aperture value providing a proper exposure if the kind of the automatic exposure setting device is the programmed automatic control.

The invention will become more fully apparent from the following detailed description thereof taken in conjunction with the accompanying drawings.

DESCRIPTION OF THE PREFERRED EMBODIMENTS

Description will first be made of a first embodiment in which the present invention is applied to a camera provided with a manual exposure setting device and an automatic exposure setting device of aperture priority automatic exposure control.

Figures 1, 2:
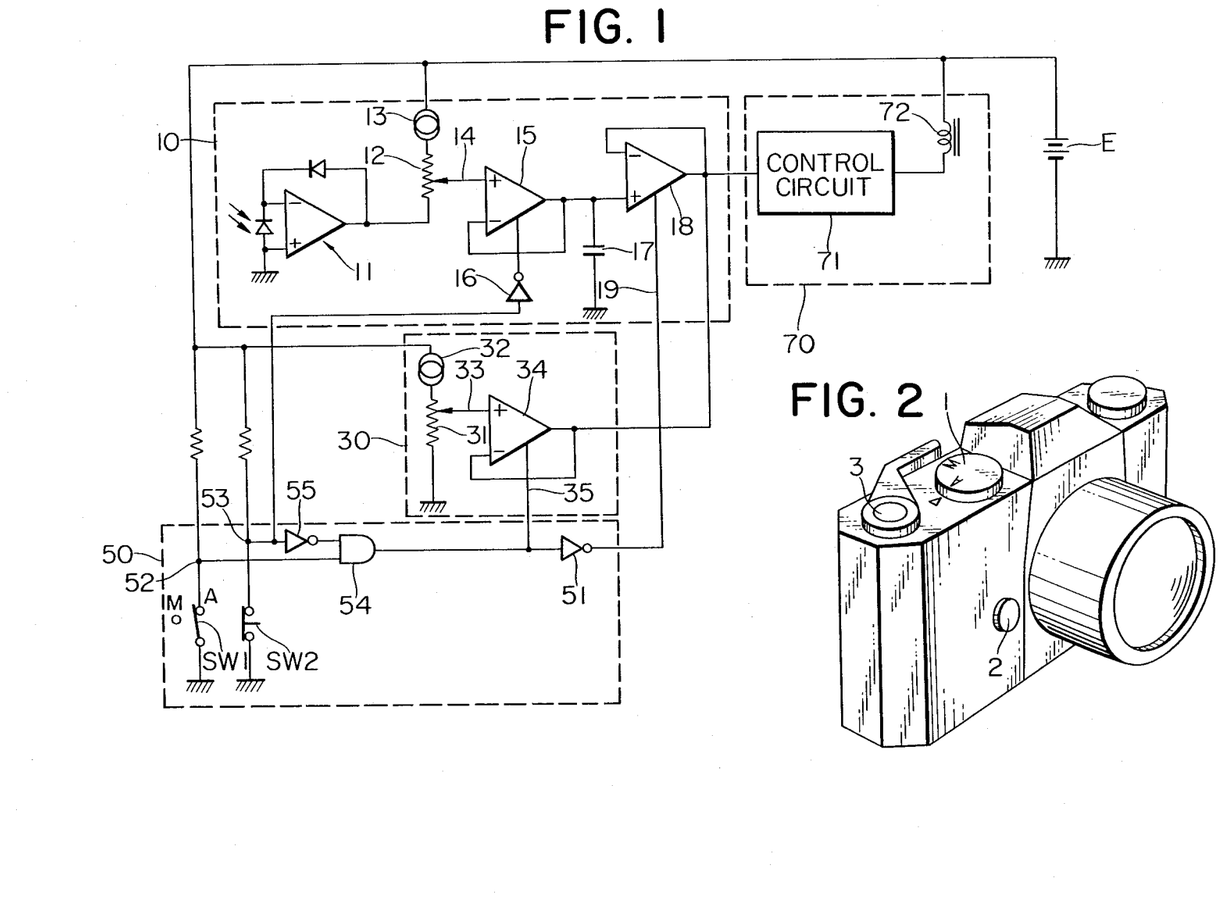
FIG. 1 is a circuit diagram of an exposure control apparatus according to a first embodiment of the present invention.
FIG. 2 is a perspective view showing the appearance of a camera according to the first embodiment.

The circuitry of FIG. 1 comprises an automatic exposure setting circuit 10, a manual exposure setting circuit 30, a change-over circuit 50 and an exposure control circuit 70. The automatic exposure setting circuit 10 has a photoelectric converting circuit 11 for photometering the brightness of an object to be photographed, and also has a resistor 12 connected between the output of the photoelectric converting circuit 11 and a constant current source 13. The resistor 12 is operatively associated with an ASA speed dial and an aperture ring, both not shown, and has its resistance value varies by a slidable contact 14 and constitutes a potentiometer. A voltage corresponding to a proper shutter time based on the information of the object brightness, the ASA speed and the aperture value appears at this potentiometer, and this voltage is applied as an input to a buffer amplifier 15. This buffer amplifier 15 is of an input-output ratio of 1:1 and is directed for impedance conversion.

When the output of an inverter 16 is at Hi level, the buffer amplifier 15 is supplied with power and becomes operative to charge a capacitor 17 with a voltage corresponding to a proper shutter time. When the output of the inverter 16 is at Lo level, the buffer amplifier 15 becomes inoperative and the voltage corresponding to the proper shutter time is maintained in the capacitor 17. Thus, the buffer amplifier 15 has also the function of an analog switch by the inverter 16.

When a signal line 19 is at Hi level, a buffer amplifier 18 having one of its inputs connected to the capacitor 5 is supplied with power and becomes operative to put out a voltage to a magnet control circuit 71 which controls a magnet 72 holding the closing blades of the shutter, and when the signal line 19 is at Lo level, the buffer amplifier 18 becomes inoperative. That is, this buffer amplifier 18 has also the function of an analog switch.

The manual exposure setting circuit 30 has a potentiometer comprising a resistor 31 connected between a gland and a constant current source 32, and a contact 33 operatively associated with a shutter dial disposed externally of the camera. A voltage corresponding to a shutter time set by the shutter dial appears at this potentiometer, the potentiometer being connected to the input of a buffer amplifier 34. When a signal line 35 is at Hi level, the buffer amplifier 34 is supplied with power and becomes operative to put out to a circuit 70 a voltage corresponding to a manually set shutter time. When the signal line 35 is at Lo level, the buffer amplifier 34 becomes inoperative. That is, this buffer amplifier 34 has also the function of an analog switch.

The change-over circuit 50 produces two outputs connected to the buffer amplifiers 19 and 35, respectively. The two outputs have opposite output levels by an inverter 51 and accordingly, the buffer amplifiers 19 and 35 do not become operative at a time and a voltage corresponding to either a shutter time which provides a proper exposure or a manually set shutter time is applied as an input to the circuit 70.

The change-over circuit 50 is provided with two switches. A first switch SW1, which is a mode selecting switch, is operatively associated with a mode selector 1 provided in the upper portion of the camera for alternatively selecting a manual mode and an auto mode, as shown in FIG. 2, and is designed to be closed when the auto mode is selected and to be opened when the manual mode is selected. When the switch SW1 is closed, a junction 52 assumes Lo level and, when the switch SW1 is opened, the junction 52 assumes Hi level. A switch SW2 which is a second operation switch is adapted to be closed and opened by the operation of an operating button 2 provided in the front face of the camera so as to be operable by the operator while he is looking into the finder. When the switch SW2 is opened, a junction 53 assumes Hi level and, when the switch SW2 is closed, the junction 53 assumes Lo level.

The junction 52 provides one input of an AND gate 54, and the junction 53 provides the other input of the AND gate 54 through an inverter 55 and also provides the input of the inverter 16.

The second switch SW2 is normally closed. When the aperture priority automatic exposure setting mode is selected with the selecting switch SW1 closed, the junctions 52 and 53 assume Lo level, whereby the output of the inverter 16 assumes Hi level and the buffer amplifier 15 is supplied with power and is operating. Consequently, the capacitor 17 is charged with a voltage corresponding to a shutter time which provides a proper exposure, and that voltage is put out to the buffer amplifier 18. Also, the output of the AND gate 54 with the junction 52 at Lo level as the input assumes Lo level and the buffer amplifier 35 becomes inoperative. On the other hand, since the signal line 19 assumes Hi level, the buffer amplifier 18 is supplied with power and becomes operative to put out to the circuit 70 a voltage corresponding to a shutter time which provides a proper exposure. Thereafter, the shutter release button 3 is depressed, whereby the shutter is controlled on the basis of this output voltage. When the operating button 2 is now depressed to open the switch SW2, the junction 53 assumes Hi level and the output of the inverter 16 assumes Lo level, and the contents stored in the capacitor 17 are fixed, as a result of which a voltage corresponding to a proper shutter time is stored in the capacitor 17. This operation is called the exposure memory lock. Since the output of the AND gate 54 remains to be at Lo level, the buffer amplifier 34 is inoperative, while the buffer amplifier 18 operates and the stored voltage is put out to the circuit 70, and the shutter is controlled at the stored shutter time by a control circuit 71.

When the mode selector is operated to open the mode selecting switch SW1, the junction 52 assumes Hi level. When the second switch SW2 is in its closed position, the junction 53 assumes Lo level and the output of the inverter 16 assumes Hi level and the buffer amplifier 15 becomes operative. Also, the output of the AND gate 54 assumes Hi level, the buffer amplifier 34 becomes operative and the buffer amplifier 18 becomes inoperative. Therefore, the output voltage of the buffer amplifier 34 corresponding to the manually set shutter time is put out to the circuit 70 and the shutter is controlled at the manually set shutter time. Of course, the aperture is manually set by the aperture presetting of the lens. During this manual setting mode, when the operating button 2 is depressed to open the second switch SW2, the junction 53 assumes Hi level and the output of the inverter 16 assumes Lo level and thus, the accumulated charge in the capacitor 17 is held. On the other hand, the output of the inverter 55 assumes Lo level, whereby the output of the AND gate 54 also assumes Lo level and the buffer amplifier 34 becomes inoperative, while conversely the buffer amplifier 18 becomes operative and therefore, the voltage corresponding to the shutter time providing the proper exposure which is stored in the capacitor 17 is put out to the circuit 70, and the shutter is controlled at a shutter time stored by the operation of the shutter release button 3 thereafter. That is, by the second switch SW2 being operated while the manual setting mode is selected, the mode is changed over from the manual setting mode to the automatic setting mode.

According to this embodiment, even when it is desired to photograph other object urgently when the camera is being used in the manual setting mode, if the camera is turned to that object and then the operating button 2 for storing the proper shutter time is depressed, a shutter time providing a proper exposure based on the preset aperture value, ASA speed and the brightness of the new object is stored in a moment and the shutter is controlled at this stored shutter time and therefore, a proper exposure is obtained.

Although the foregoing description has been made of an aperture priority automatic exposure control camera, the present invention is of course applicable also to shutter priority automatic exposure control cameras or programmed automatic exposure control cameras. In the latter case, however, the storing capacitor 17 stores therein a proper aperture value or a shutter time and an aperture value which provide a proper exposure. The present invention is also applicable to cameras designed such that in the above-described three kinds of automatic exposure setting, the object brightness information before the shutter time and/or the aperture value which provides a proper exposure is operated is stored.

In the above-described embodiment, the automatic exposure setting mode forcibly changed over by operation of the second switch SW2 when the selecting switch SW1 selects the manual exposure setting is referred to as the emergency mode, and each exposure setting mode selected by the selecting switch SW1 when the second switch is not operated is generally referred to as the normal mode.

In a camera provided with a plurality of kinds of automatic exposure setting systems, for example, shutter priority, aperture priority and programmed automatic exposure controls, it is possible to select any exposure setting system in accordance with the liking of the operator in the normal mode, and as regards the automatic exposure setting system in the emergency mode, it is also possible to pre-select it as desired.

Second to sixth embodiments which will hereinafter be described relate to a camera provided with such a plurality of kinds of automatic exposure setting systems. Any of these embodiments is designed such that when the automatic exposure setting is selected in the normal mode, the change-over to the emergency mode is not possible and that only when the manual exposure setting is selected, the change-over to the emergency mode by an arbitrarily preselected system is possible. The reason for such design is not only the fact that when the automatic exposure setting is already selected in the normal mode, the necessity of change-over to the emergency mode is low, but also the purpose of preventing the waste that the operation for the automatic exposure setting is pleonastically effected before and after the change-over.

Figure 3:
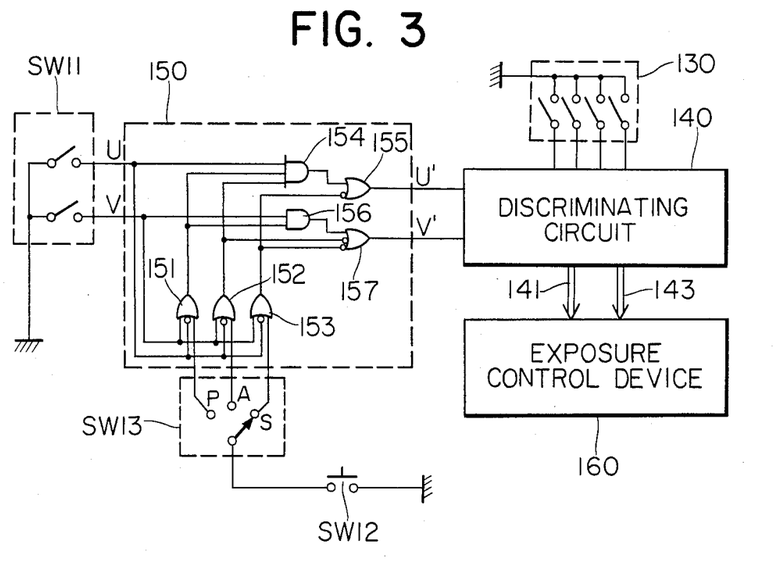
FIG. 3 is a circuit diagram of an exposure control apparatus according to a second embodiment of the present invention.
Figure 4:
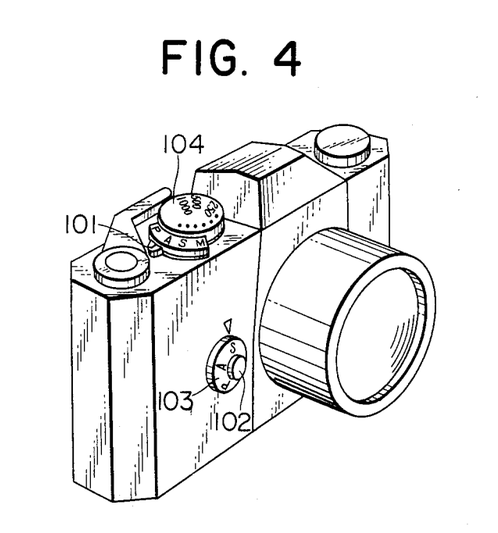
FIG. 4 is a perspective view showing the appearance of a camera according to the second embodiment.

The second embodiment is shown in FIGS. 3 and 4. A normal mode selecting switch SW11 is a two-bit gray code plate capable of selecting three automatic exposure settings and manual exposure setting by a mode selector 101 provided in the upper portion of a camera shown in FIG. 4. When the mode selector 101 is adjusted to a position P, the programmed AE mode (P mode) is selected; when the mode selector 101 is adjusted to a position A, the aperture priority AE mode (A mode) is selected; when the mode selector 101 is adjusted to a position S, the shutter speed priority AE mode (S mode) is selected; and when the mode selector 101 is adjusted to a position M, the manual exposure setting mode (M mode) is selected. An emergency mode selecting switch SW13 is connected to one of terminals P, A and S by a mode selector 103 provided on the front face of the camera and selects one of P mode, A mode and S mode. An operating switch SW12 is closed by an operating button 102 provided on the front face of the camera. A logic circuit 150 receives as inputs the electrical signals from switches SW11 and SW13, determines the mode to be adopted and puts out it as a 2-bit binary signal. A shutter time presetting circuit 130 comprises a 4-bit gray code plate and produces a binary signal indicative of the preset shutter time in response to a shutter dial 104 in the upper portion of the camera.

A discriminating circuit 140 discriminates a determined mode from the output of the logic circuit 150, produces an output signal indicative of each mode on a signal line 141 when the determined mode is P mode or A mode, and produces an output signal indicative or each mode and a binary signal indicative of the shutter time from the circuit 130 on signal line 141 and 143, respectively, when the determined mode is S mode or M mode.

This discriminating circuit 140 may be comprised of a simple logic circuit.

An exposure control device 160 is provided with conventional circuit means which includes a photometering circuit for photometering the object brightnes, a circuit for introducing film speed information and a circuit for introducing aperture value information and effects the exposure operation corresponding to the exposure setting mode transmitted from the signal line 141 to determine the aperture value and/or the shutter speed to be controlled, and conventional means for controlling an aperture mechanism and/or a shutter mechanism in accordance with the determined aperture value and/or shutter speed.

The mode selecting switch SW11 produces a 2-bit (U, V) signal as shown in Table 1 below in accordance with the selection of P, A, S or M mode.

TABLE 1

| Output | Mode | | | |
|---|---|---|---|---|
| | P | A | S | M |
| U | L | L | H | H |
| V | L | H | H | L |

First, consider a condition in which the normal mode is selected to M mode and the emergency mode selecting switch SW13 preselects S mode as shown in FIG. 3 and the switch SW12 is opened. At such time, all of OR gates 151, 152 and 153 put out H-level outputs because all of the input terminals from the switch SW13 are at H-level. Since the output of the switch SW11 is (U, V)=(H, L), AND gates 154 and 156 put out H and L and subsequently, OR gates 155 and 157 put out H and L. Thus, the output of the logic circuit 150 is (U', V')=(U, V) and is maintained in M mode. The 2-bit (U', V') signal is applied as an input to the discriminating circuit 140, which thus discriminates M mode. The shutter time set by the gray code plate 130, with the aperture information, is applied as an input to the exposure control device 160, which thus controls the aperture and the shutter and carries out manual exposure control. During the photography in such M mode, when the operating button 102 is depressed to close the switch SW12, the terminal S of the switch SW13 assumes L-level and the oututs of the OR gates 151, 152 and 153 become H, H and L, respectively. Thus, the output of the logic circuit 150 becomes (U', V')=(H, H). In response to this output, the discriminating circuit 140 discriminates S mode and produces a signal indicative of S mode on the signal line 141 while, at the same tixe, it transmits the shutter time set by the gray code plate 130 to the exposure control device 160 through a signal line 143, and the control device 160 carries out the exposure operation and control by the shutter priority. Thus, the change-over to the selected emergency mode has accomplished.

When the emergency mode is selected to P mode or A mode by operation of the mode selector 103, the OR gate 151 or 152 assumes L-level due to the closing of the switch SW12 and therefore, the output of the logic circuit 150 becomes (U, V)=(L, L) or (U, V)=(L, H). That is, if the normal mode of M mode is only selected, the mode will be changed over from M mode to P mode or A mode by the operating button 102 being depressed.

Next, consider a condition in which the normal mode is selected to P mode and the emergency mode selecting switch SW13 selects A mode and the switch SW12 is opened. All of the OR gates 151, 152 and 153 put out H-level outputs and the output (U, V) of the selecting switch SW11 is (L, L) and therefore, all of the AND gates 154, 156 and the OR gates 155, 157 put out L-level outputs. Accordingly, the output of the logic circuit 150 becomes (U', V')=(U, V) and is maintained in P mode. In response to this output, the discriminating circuit 140 discriminates P mode and produces a signal indicative of P mode on the signal line 141. The signal indicative of the shutter speed set by the gray code plate 130 is cut. On the basis of the object brightness, the exposure control device 160 determines the combination of the aperture value and the shutter time in accordance with a predetermined program and controls the camera. When the operating button 102 is now depressed to close the switch SW12, the terminal A of the switch SW13 assumes L-level while the output (U, V) of the selecting switch SW11 is (L, L) and therefore, the outputs of the OR gates 151, 152 and 153 all remain to be at H-level. Therefore, the outputs of the AND gates 154, 156 and the OR gates 155, 157 also remain unchanged with the result that the output of the logic circuit 150 is maintained in P mode. When the normal mode selecting switch SW11 so selects P mode, the mode never changes over to the emergency mode. When the normal mode selecting switch SW11 selects A mode or S mode, the output (U, V) thereof is (L, H) or (H, H) and the outputs of the OR gates 151, 152 and 153 are all H. Consequently, the outputs of these OR gates are not affected by the operating switch SW12 and the logic circuit 150 produces an output (U', V') of the same content as the input (U, V). That is, if the normal mode is the automatic exposure setting mode, the logic circuit 150 prevents the change-over from the normal mode to the emergency mode.

Figures 5, 6:
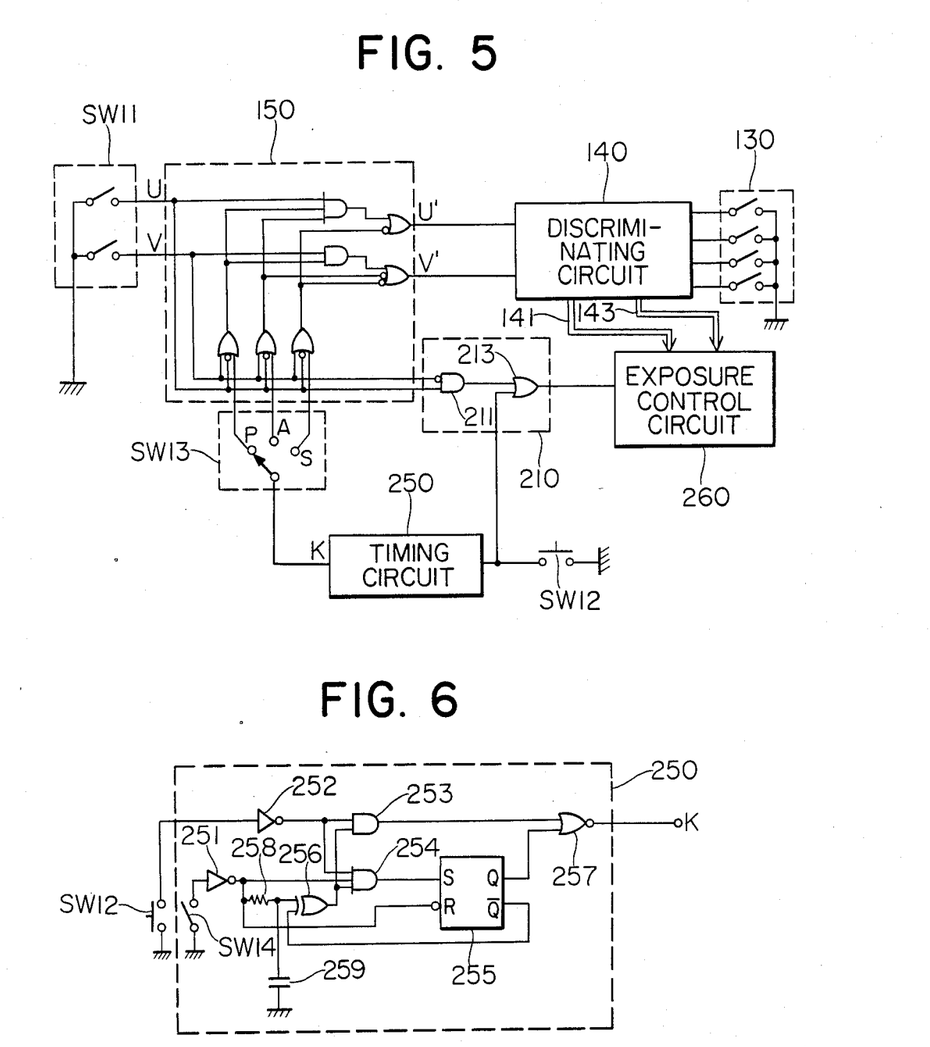
FIG. 5 is a circuit diagram of an exposure control apparatus according to a third embodiment of the present invention.
FIG. 6 shows the circuit construction of the circuit block 250 of FIG. 5.

FIGS. 5 and 6 show the third embodiment. The circuitry of FIG. 5 is of a construction in which two circuit blocks 210 and 250 are further added to the circuitry of FIG. 3. An exposure control circuit 260 is substantially similar to the circuit 160 of FIG. 3, but is provided with an input for introducing the signal from the circuit 210 to hold the result of the exposure operation. This holding function is similar to that of the elements 15–17 in the embodiment of FIG. 1. The AND gate 211 of a logic circuit 210 puts out H-level only when the selecting switch SW11 selects M mode. Accordingly, an OR gate 213 puts out L-level only when the selecting switch SW11 selects the automatic exposure setting, i.e., one of P, A and S modes and the operating switch SW12 is closed. The L-level output of the OR gate 213 serves to fix the contents accumulated in the memory capacitor in the exposure control circuit 260. Accordingly, when the normal mode is M mode, the operating switch SW12 functions as a change-over switch to the emergency mode and, when the normal mode is the automatic exposure setting mode, the operating switch SW12 functions as an operating switch for the exposure memory lock in that mode.

A timing circuit 250 will now be described. Two types are conceivable as the structure of the operating switch SW12. A first type is one which is closed by the first stroke (one reciprocal movement) of the operating button and opened by the second stroke of the operating button. A second type is a so-called momentary switch which is closed by the first half (forward movement) of the stroke of the operating button and opened by the second half (backward movement). The second type is preferable as the operating switch having two functions as in the embodiment of FIG. 5. However, the operating switch SW12 need be continuously closed during the photography by the emergency mode until exposure control is completed, and if it is opened during the exposure control, M mode will be restored to a great inconvenience. Therefore, the circuit 250 is provided to maintain the switch SW12 in substantially closed position until the exposure control is completed even if the operating button 102 is released during the photography by the emergency mode. The specific construction of the circuit 250 is shown in FIG. 6. A timing switch SW14 is adapted to be closed before the exposure of the film to light and opened after completion of the exposure, such as being closed upon starting of the retraction of a return mirror from the picture-taking optical path and opened upon completion of the return of the return mirror to the optical path. In the normal condition, both the switches SW12 and SW14 are opened and therefore, the outputs of inverters 251 and 252 are L, the outputs of AND gates 253 and 254 are L, flip-flop 255 is in its reset state, an exclusive OR gate 256 puts out H-level, and the output terminal K of a NOR gate 257 is at H-level. When the switch SW12 is closed in this condition, the output of the AND gate 253 assumes H-level and therefore the terminal K assumes L-level. If the switch SW11 selects M mode at this time, the change-over to the emergency mode is accomplished. Thereafter, the release button of the camera is depressed and the timing switch SW14 is closed with the starting of the operation of the return mirror. Thereupon, the output of the inverter 251 becomes H, but a delay circuit comprising a resistor 258 and a capacitor 259 keeps the L-level in the condition before a predetermined time at the junction therebetween, and keeps the output of the exclusive OR gate 256 at H until the $\overline{Q}$ output of the flip-flop 255 changes from H to L. Substantially simultaneously with the lapse of the predetermined time, the $\overline{Q}$ output also changes to L and therefore, the output of the exclusive OR gate 256 is intactly maintained at H. That is, when the timing switch SW14 has been closed, the output of the AND gate 254 becomes H and therefore, the flip-flop 255 is brought into its set state and puts out H from the Q output thereof. Consequently, the output of the NOR gate 257 remains to be L even if the operating switch SW12 is opened. Therefore, the emergency mode is maintained and the photographing mode does not change until the timing switch SW14 is opened with the completion of the return operation of the return mirror of the camera.

In this manner, when the selecting switch SW11 selects M mode, the mode is changed over to the emergency mode by the operation of the switch SW12 and, when the switch SW11 selects the automatic exposure setting mode, exposure memory lock can be accomplished. Further, it is also possible to control the exposure control information displaying operation of display means, not shown, by the use of the output from the terminal K of the timing circuit.

Figure 7:
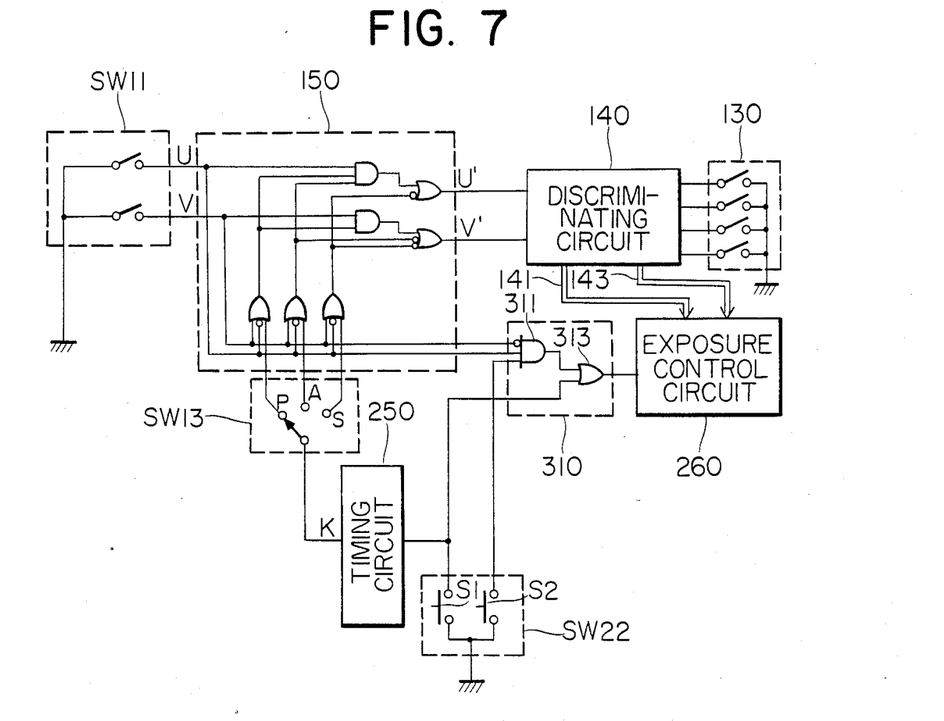
FIG. 7 is a circuit diagram of an exposure control apparatus according to a fourth embodiment of the present invention.
Figure 8:
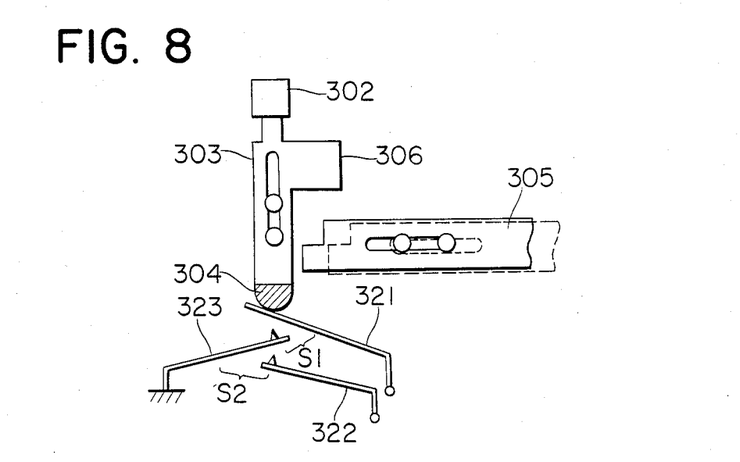
FIG. 8 schematically shows the structure of the operating switch of FIG. 7.

FIGS. 7 and 8 show the fourth embodiment. The circuitry of FIG. 7 is substantially the same as the circuitry of FIG. 5 except an operating switch SW22 and a logic circuit 310. The operating switch SW22 comprises switches S1 and S2 and is a two-operation type switch as shown in FIG. 8. Any of three electrode plates 321, 322 and 323 has a plate spring action. The electrode plates 321 and 323 together constitute the switch S1, and the electrode plates 322 and 323 together constitute the switch S2. Each electrode plate is pushed into contact with the adjacent electrode plate by the insulating portion 304 of a slider 303 downwardly movable by an operating button 302 projected outwardly of the camera. The amount of downward movement of the slider 303 is limited by a stop 305. The stop 305 is operatively associated with the normal mode selecting switch SW11 of FIG. 7 and is moved to a solid-line position when the switch SW11 is in one of P, A and S modes, and moved to a broken-line position when the switch SW11 is in M mode.

If the operating button 302 is depressed when the stop 305 is in the solid-line position, the slider 303 moves downwardly until the blade 306 thereof bears against the upper edge of the stop 305 and as a result, the electrode plates 321 and 323 come into contact with each other. Accordingly, only the switch S1 is closed. When the stop 305 is in the broken-line position, the slider 303 can move downwardly until the electrode plates 321, 323 and 322, 323 come into contact with each other, thereby closing the switches S1 and S2.

When the selecting switch SW11 selects one of P, A and S modes, the output (U, V) is determined as shown in Table 1 above and therefore, the AND gate 311 is not opened and accordingly always puts out L-level. When the operating button 302 is then depressed, the switch S1 is closed and the output of OR gate 313 assumes L-level, and the contents of the memory capacitor of the exposure control circuit 260 are fixed and exposure memory lock is accomplished. When the selecting switch SW11 selects M mode, the output (U, V) is (H, L) and therefore, as long as the switch S2 is opened, the AND gate 311 of the logic circuit 310 puts out H-level and the output of the OR gate 313 becomes H. When the switch S1 is closed by depressing the operating button 302 by a half stroke, M mode is changed over to the emergency mode (in this case, P mode is selected). Both the switches S1 and S2 are closed by further depressing the operating button 302, and therefore, the output of the AND gate 311 changes to L and the output of the OR gate 313 also becomes L. As a result, the contents of the memory capacitor of the exposure control circuit 260 are fixed.

Figure 9:
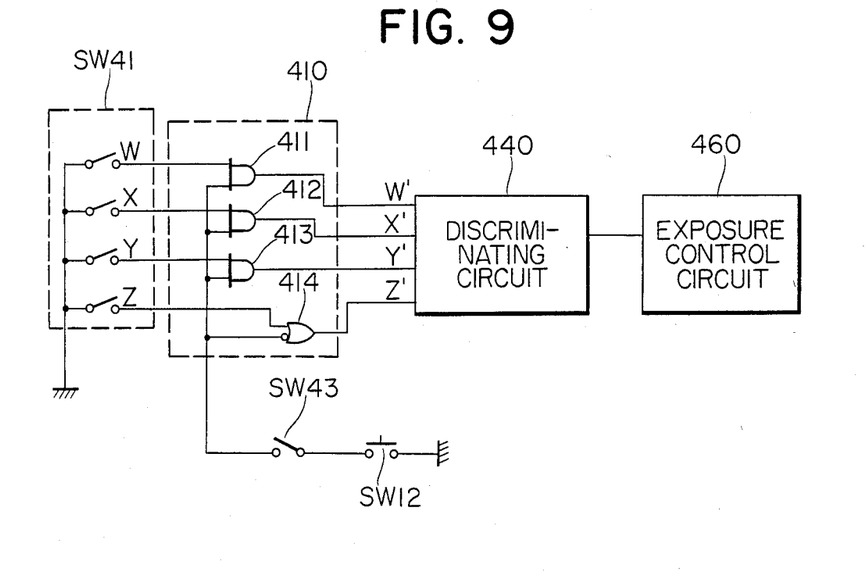
FIG. 9 is a circuit diagram of an exposure control apparatus according to a fifth embodiment of the present invention.
Figure 10:
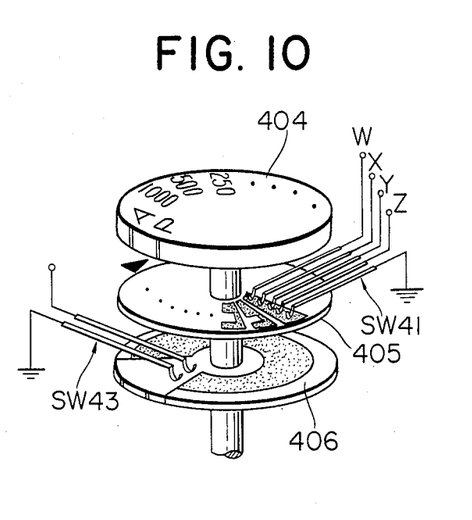
FIG. 10 is a perspective view showing the structure of a switch operatively associated with the shutter dial of a camera.

FIGS. 9 and 10 show the fifth embodiment. The device of this embodiment has P mode and A mode as the automatic exposure setting mode and is designed to be set to A mode when the mode is changed over to the emergency mode. As shown in FIG. 10, the levels of the four outputs W, X, Y and Z of a normal mode selecting switch SW41 are determined by a 4-bit gray code plate 405 operatively associated with a shutter dial 404. The shutter dial 404 can select the automatic exposure settings of P and A modes and the M mode of each shutter time 1/1000, 1/500, 1/250, . . . , and the levels of the outputs W, X, Y and Z in each mode are set as shown, for example, in Table 2 below.

TABLE 2

| Output | Mode P | A | M 1/1000 | 1/500 | 1/250 | |
|---|---|---|---|---|---|---|
| W | L | L | L | L | L | ... |
| X | L | L | L | L | H | ... |
| Y | L | L | H | H | H | ... |
| Z | L | H | H | L | L | ... |

A switch 43 is controlled by a disc 406 operatively associated with the shutter dial and having the surface thereof partly coated with metal foil. The switch 43 is opened when the shutter dial 404 is set to P mode or A mode, and is closed when the shutter dial 404 is set to the other position. Now, consider a case where a normal mode selecting switch SW41 selects P mode. At such time, the switch SW43 is opened as previously described. Accordingly, the outputs (W, X, Y, Z)=(L, L, L, L) of the switch SW41 are applied as inputs to a logic circuit 410, which thus produces outputs (W', X', Y', Z')=(L, L, L, L). A discriminating circuit 440 discriminates P mode and transmits its output to an exposure control circuit 460. The switch SW43 is opened at such time and therefore, the logic circuit 410 is not affected by ON-OFF of an operating switch SW12.

When the selecting switch SW41 selects M mode, the switch SW43 is closed. Accordingly, when the operating switch SW12 is in open position, the logic circuit 410 transmits the outputs W', X', Y' and Z' of Table 2 to the discriminating circuit 440 and, when the operating switch SW12 is closed, all of AND gates 411, 412 and 413 put out L-level independently of the contents of the outputs W, X and Y and OR gate 414 puts out H-level independently of the contents of the output Z. Consequently, the output of the logic circuit 410 becomes (W', X', Y' Z')=(L, L, L, H) and thus is indicative of A mode.

Figure 11:
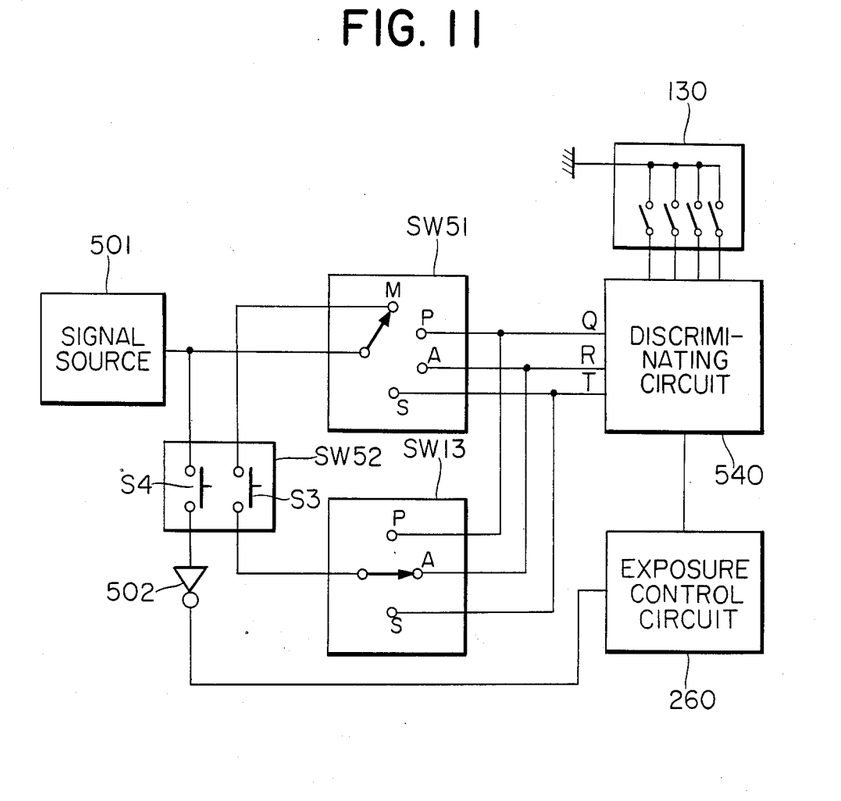
FIG. 11 is a circuit diagram of an apparatus according to a sixth embodiment of the present invention.

FIG. 11 shows the sixth embodiment. The selecting switch SW13, the gray code plate 130 and the exposure control circuit 260 are similar in construction to those described in reference to the third embodiment. A normal mode selecting switch SW51 selects one of M, P, A and S modes. Each of these selecting switches SW13 and SW51 comprises a change-over operating member such as a rotary switch. A discriminating circuit 540 discriminates the photographing mode from the combination of input signals Q, R and T as shown in Table 3 below. A signal line 501 puts out H-level by the operation of closing the main switch, not shown, of the camera. An operating switch SW52 has a switch S3 for changing over the mode to the emergency mode and a switch S4 for exposure memory lock, and is designed such that the switch S3 is closed by the first half of the stroke provided by depressing an operating button projected outwardly of the camera and the switch S4 is closed by the second half of the stroke.

TABLE 3

| Output | Mode | | | |
|---|---|---|---|---|
| | M | P | A | S |
| Q | L | H | L | L |
| R | L | L | H | L |
| T | L | L | L | H |

When the mode selecting switch SW51 selects M mode, the H-level signal from a signal source 501 enters the contact of M mode and the input to the discriminating circuit 540 becomes (Q, R, T)=(L, L, L). The discriminating circuit 540 discriminates M mode and transmits its signal and the output from the gray code plate 130 to the exposure control circuit 260. When the operating button is then depressed by a half stroke to close the switch S3, the H-level signal from the signal source 501 flows into the contact of A mode, for example, to which the emergency mode selecting switch SW13 has been set, to thereby render the R input of the discriminating circuit into H-level and therefore, the input of the discriminating circuit becomes (Q, R, T)=(L, H, L). The discriminating circuit 540 then discriminates A mode and transmits its signal to the exposure control circuit 260. When the operating button is further depressed, the switch S4 is closed, and the H-level signal from the signal source 501 becomes an L-level signal through an inverter 502 and is transmitted to the exposure control circuit 260 for exposure memory lock.

When the selecting switch SW51 selects one of P, A and S modes, the H-level signal from the signal source 501 is applied to a terminal being selected. For example, when P mode is selected, the input becomes (Q, R, T)=(H, L, L) and the discriminating circuit discriminates P mode, and the exposure control circuit effects programmed AE control. At that time, exposure memory lock can be accomplished by depressing the operating button by the full stroke.

We claim:

1. An exposure control apparatus of a camera comprising:
   (a) exposure control means adjusted to control the quantity of light applied onto a photosensitive film;
   (b) means having means for preparing a photometering output responsive to the quantity of light from an object to be photographed, said means being effective to prepare on the basis of said photometering output a first output used to adjust said exposure control means so that the quantity of light applied onto said film is proper;
   (c) means including means for setting the exposure amount by manual operation, said means being effective to prepare a second output used to adjust said exposure control means so that said set exposure amount is obtained;
   (d) selecting means having a first selecting position for making said first output effective and a second selecting position for making said second output effective, in order to adjust said exposure control means; and
   (e) operating means operated to store said photometering output, said operating means including change-over means operated when said selecting means is in said second selecting position to thereby act on said selecting means and make said first output instead of said second output effective.

2. An exposure control apparatus according to claim 1, wherein said photometering output has a magnitude indicative of the value of an exposure factor controlled by said exposure control means for providing a proper exposure amount relative to said object to be photographed.

3. An exposure control apparatus according to claim 2, wherein said exposure control means controls the exposure time of said film and said photometering output has a magnitude corresponding to said exposure time.

4. An exposure control apparatus according to claim 1, wherein said selecting means includes means for producing a first electrical level and a second electrical level, respectively, when said selecting means is in said first selecting position and said second selecting position, and means responsive to said first electrical level to cause said exposure control means to respond to said first output and responsive to said second electrical level to cause said exposure control means to respond to said second output, and said change-over means converts said second electrical level into said first electrical level in response to said operating means.

5. An exposure control apparatus of a camera comprising:
   (a) exposure control means adjusted to control the quantity of light applied onto a photosensitive film, said exposure control means having modes regarding a plurality of different adjustments including first and second modes;
   (b) first designating means for making a signal for designating the mode of said exposure control means, said first designating means producing a signal selected from among a plurality of signals including a first signal for designating said first mode and a second signal for designating said second mode;
   (c) second designating means for making a signal for designating the mode of said exposure control means, said second designating means producing a third signal for designating said first mode; and
   (d) means for preferentially selecting one of the signals produced by said first and second designating means to designate the mode of said exposure control means, said selecting means taking preference of the first signal from said first designating means when said first designating means is producing said first signal and taking preference of the third signal from said second designating means when said first designating means selects said second signal.

6. An exposure control apparatus according to claim 5, wherein said second designating means includes operating means and produces said third signal in response to said operating means, and said selecting means selects the signal from said first designating means where there is not said third signal from said second designating means.

7. An exposure control apparatus according to claim 6, wherein said exposure control means includes means for preparing a photometering output responsive to the quantity of light from the object to be photographed, and means for setting the exposure amount by manual operation, and is adjusted in said first mode in response to said photometering output and adjusted in said second mode so that said set exposure amount is obtained.

8. An exposure control apparatus according to claim 7, wherein said operating means has a first operating position for producing said signal, and a second operating position operated subsequently to said first operating position for producing a holding signal acting on said exposure control means to hold said photometering output.

9. An exposure control apparatus of a camera comprising:
(a) exposure control means adjusted to control the quantity of light applied onto a photosensitive film, said exposure control means having a plurality of kinds of automatic adjustment modes in which the kinds of controlled exposure factors differ from one another, the values of said controlled exposure factors in the respective ones of said automatic adjustment modes varying in response to the quantity of light from an object to be photographed;
(b) first operating means operated to designate the mode of said exposure control means;
(c) second operating means operated to change over the mode designated by said first operating means to another one of said automatic adjustment modes; and
(d) means responsive to said second operating means to hold the values of said controlled exposure factors in said another mode.

10. An exposure control apparatus according to claim 9, wherein said second operating means has a first movement area and a second movement area subsequent thereto and includes a member moved in said first movement area to change over the mode to said another mode, and said holding means is responsive to the movement of said member in said second movement area.

* * * * *